United States Patent
Minks-Brown

(10) Patent No.: US 10,078,854 B1
(45) Date of Patent: Sep. 18, 2018

(54) INTERFACE FOR CROSS-CHANNEL ADVERTISING CAMPAIGN

(71) Applicant: Sprint Communications Company L.P., Overland Park, KS (US)

(72) Inventor: Christa L. Minks-Brown, Olathe, KS (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 1148 days.

(21) Appl. No.: 14/289,650

(22) Filed: May 29, 2014

(51) Int. Cl.
G06Q 30/00 (2012.01)
G06Q 30/02 (2012.01)

(52) U.S. Cl.
CPC ..... *G06Q 30/0276* (2013.01); *G06Q 30/0243* (2013.01)

(58) Field of Classification Search
CPC .................................. G06Q 30/0207–30/0277
USPC .................................................... 705/14, 319
See application file for complete search history.

(56) References Cited

U.S. PATENT DOCUMENTS

| | | | | |
|---|---|---|---|---|
| 7,237,252 B2* | 6/2007 | Billmaier | ............... | G06F 1/3203 348/E5.006 |
| 7,925,739 B2* | 4/2011 | Kocho | ................... | G06Q 30/02 705/14.1 |
| 9,009,064 B2* | 4/2015 | Karlin | .................... | G06Q 30/02 705/14.16 |
| 9,454,291 B2* | 9/2016 | Helfman | ........... | G06F 17/30572 |
| 2002/0103698 A1* | 8/2002 | Cantrell | ................ | G06Q 30/02 705/14.55 |
| 2008/0262914 A1* | 10/2008 | Suveyke | ................ | G06Q 30/02 705/14.54 |
| 2014/0120864 A1* | 5/2014 | Manolarakis | ...... | G06Q 30/0251 455/405 |
| 2014/0324604 A1* | 10/2014 | Munoz Torres | ... | G06Q 30/0276 705/14.72 |
| 2015/0213488 A1* | 7/2015 | Karande | ............ | G06Q 30/0246 705/14.45 |
| 2015/0379577 A1* | 12/2015 | Han | .................... | G06Q 30/0264 705/14.61 |

OTHER PUBLICATIONS

ProQuest NPL Search Results (Year: 2018).*

* cited by examiner

*Primary Examiner* — Matthew T Sittner
*Assistant Examiner* — Richard G Reinhardt

(57) ABSTRACT

A cross-channel advertising campaign system is provided. The system comprises a memory, a processor, and an application. The application is stored in the memory, executable by the processor, and configured such that the cross-channel advertising campaign system receives advertising content designed for display in a first advertising channel, and further configured such that the advertising content is converted into a design for display in a second advertising channel. The conversion includes associating an address in the first advertising channel and an address in the second advertising channel with a single user.

6 Claims, 7 Drawing Sheets

INTERFACE FOR CROSS-CHANNEL ADVERTISING CAMPAIGN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The proliferation of electronic telecommunications devices has opened up new paths for the delivery of advertisements. Devices to which advertisements may be delivered include, but are not limited to, smart phones, tablets, and set-top boxes in homes for the delivery of media content to television sets. Media through which advertisements may be delivered to such devices include, but are not limited to, web browsers, email applications, text messaging applications, Internet Protocol (IP) notification systems, and in-home display screens of devices attached to set-top boxes. The advertisements may include banner advertisements, side-bar advertisements, pop-up advertisements, text-based advertisements, or any other type of vehicle for presenting a marketing message in an advertising channel.

SUMMARY

In an embodiment, a cross-channel advertising campaign system is provided. The system comprises a memory, a processor, and an application. The application is stored in the memory, executable by the processor, and configured such that the cross-channel advertising campaign system receives advertising content designed for display in a first advertising channel, and further configured such that the advertising content is converted into a design for display in a second advertising channel. The conversion includes associating an address in the first advertising channel and an address in the second advertising channel with a single user to whom the advertising content is transmitted via the first advertising channel and the second advertising channel.

In another embodiment, a cross-channel advertising campaign system is provided. The system comprises a memory, a processor, and an application. The application is stored in the memory, executable by the processor, and configured such that the cross-channel advertising campaign system displays a first graphical object representing information related to a first advertising channel in a cross-channel advertising campaign, wherein a size of a first component in the first graphical object represents a number of impressions targeted to occur in the first advertising channel, a size of a second component in the first graphical object represents a number of impressions that have actually occurred through a specified time in the first advertising channel, and a size of a third component in the first graphical object represents a number of actions that have been taken through the specified time on impressions in the first advertising channel. The application is further configured such that the cross-channel advertising campaign system displays a second graphical object representing information related to a second advertising channel in the cross-channel advertising campaign, wherein a size of a first component in the second graphical object represents a number of impressions targeted to occur in the second advertising channel, a size of a second component in the second graphical object represents a number of impressions that have actually occurred through the specified time in the second advertising channel, and a size of a third component in the second graphical object represents a number of actions that have been taken through the specified time on impressions in the second advertising channel.

In another embodiment, a method for managing a cross-channel advertising campaign is provided. The method comprises: receiving, via a first interface on a computing system, original advertising content designed for display in a first advertising channel; converting, by a processor in the computing system, original advertising content into converted advertising content for display in a second advertising channel; displaying, in a second interface on the computing system, the converted advertising content; and displaying, in a third interface on the computing system, a first graphical object and a second graphical object, wherein sizes of components in the first graphical object and the second graphical object represent values associated with the first advertising channel and the second advertising channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
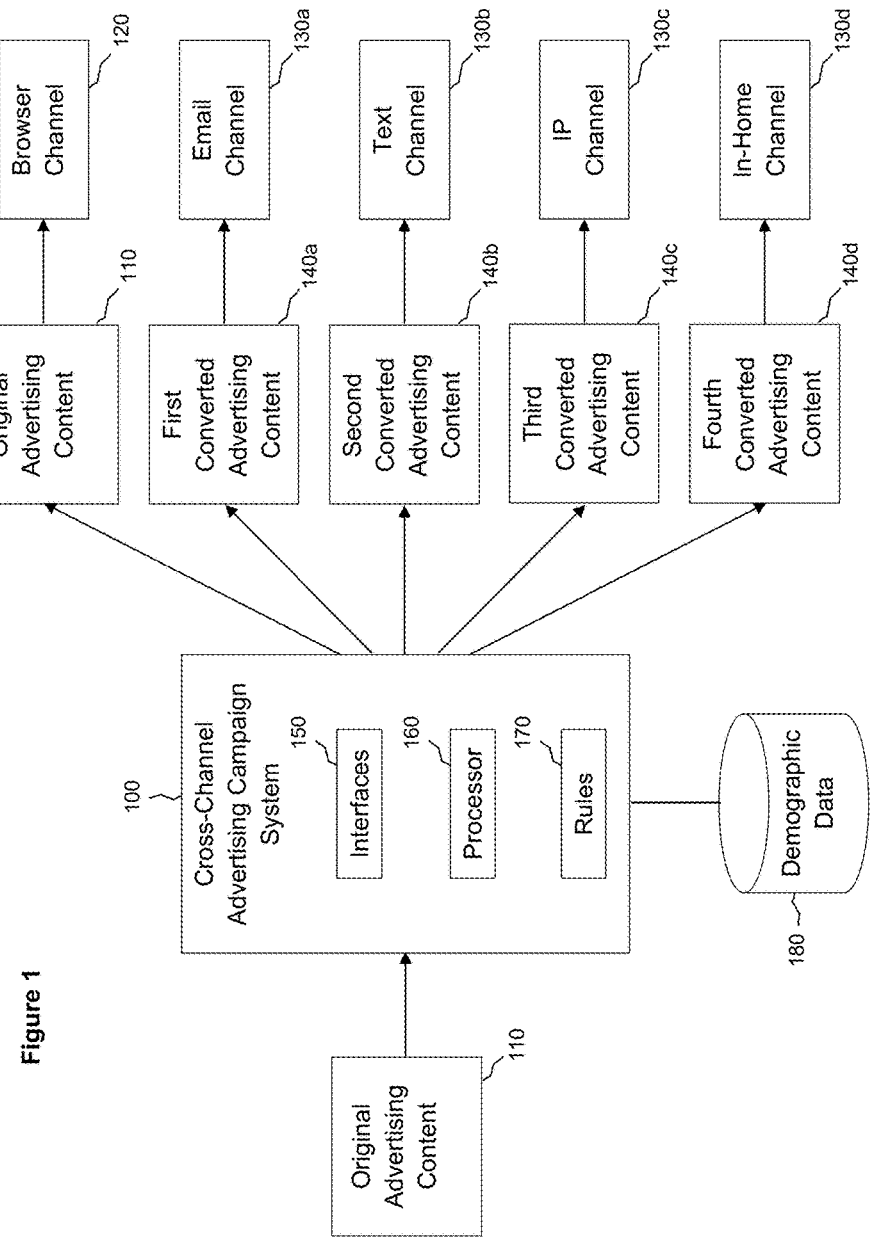
FIG. 1 is a block diagram illustrating a cross-channel advertising campaign system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The embodiments disclosed herein may pertain to advertising content that may be delivered to a plurality of types of electronic telecommunications devices. The devices may typically include wireless devices such as smart phones, tablets, and the like, but in some cases, the advertising content may additionally or alternatively be delivered to wired devices such as set-top boxes.

The embodiments provide an integrated cross-channel advertising system that converts advertising content between formats, targets advertisements to specific users, tracks the effectiveness of advertisements, and allows the targeting of advertisements to be easily modified between channels in near real time based on near real time feedback of current results in the different channels. The system may allow similar advertising content to be targeted to mobile device users via several different channels, thus potentially increasing the effectiveness of the advertising content. The system may also automatically convert advertising content from one format to another. The system may also provide improved techniques for targeting advertisements to specific demographic groups and sub-groups. The system may also display in near real time results indicating the relative effectiveness of an advertising campaign in different channels. The system may also provide an interface that allows the targeting of advertising content to be easily and quickly increased or decreased in different channels.

In an embodiment, a system and method are provided that assist an advertiser in creating a cross-channel advertising campaign that provides consistent content across multiple different advertising channels. The advertiser may create advertising content in a first format appropriate for a first advertising channel, and that content may be automatically converted into a second format appropriate for a second advertising channel.

In an embodiment, such a system may also present a graphical display interface that assists an advertiser in setting various parameters that may identify and/or define a target audience for a cross-channel advertising campaign. Once the cross-channel advertising campaign has been launched, the system may present a graphical display interface that shows how effectively the advertisements in each of the channels are currently reaching a target audience and inducing responses from the target audience.

In an embodiment, such a system may also assist an advertiser in resetting such parameters associated with a target audience. A plurality of graphical objects may be displayed, and components in the graphical objects may represent information related to the cross-channel advertising campaign. A change by a user of the system in the size of one of the components may act as an input command to change a parameter associated with the cross-channel advertising campaign. In such a way, while the cross-channel advertising campaign is in progress, an advertiser has the capability to make changes easily and "on the fly" to target parameters for target audiences or for demographic groups within target audiences in one or more advertising channels.

One type of advertising channel may be a web browser or similar application on a mobile phone, smart phone, tablet, or similar device. Advertisements that may appear in the browser may include banner advertisements, side-bar advertisements, pop-up advertisements, or other types of graphics-based and/or text-based messages. Another type of advertising channel may be an email channel in which similar types of advertisements may appear in an email application on similar types of devices. Another type of advertising channel may be a text message channel on similar types of devices. Yet another type of advertising channel may be an Internet Protocol (IP) channel that uses the IP notification system on similar types of devices. The IP notification system is a pathway that uses the IP network, rather than the data and control channels of a wireless telecommunications network, for the delivery of notifications and similar brief messages to a notification bar or a similar location on a device. Still another type of advertising channel may be an in-home channel that uses a set-top box or similar in-home device to display web pages, television programming, or similar video content on a television screen or other video monitor.

Alternatively, the term "advertising channel" may refer to the style, format, or content of an advertisement. For example, banner advertisements, splash advertisements, pop-up advertisements, side-bar advertisements, video advertisements, audio advertisements, text-only advertisements, and other types of advertisement may all be considered different advertising channels. In another alternative, the different types of web sites for which an advertisement is intended may be considered different advertising channels. For example, a social media web site, a search results web site, and a news web site may be viewed as different advertising channels. These types of advertising channels are given as examples, and it should be understood that the embodiments disclosed herein may apply to other types of advertising channels.

In general, channels may be defined according to transport protocol, such as IP, Short Message Service (SMS), Multimedia Messaging Service (MMS), or Hypertext Transport Protocol (HTTP). Thus, channels may comprise an IP channel, a SMS channel, an MMS channel, an HTTP channel. Alternatively, channels may be defined according to destination, such as web sites, email applications, or set-top boxes. Thus, channels may comprise an email channel, a set-top box channel, a web site A channel, a web site B channel, a web site C channel, and other web site channels. Alternatively, channels may be defined according to format, such as banner advertisements, splash advertisements, pop-up advertisements, video advertisements, or audio advertisements. Thus, channels may comprise a banner ad channel, a splash ad channel, a pop-up ad channel, a video ad channel, and an audio ad channel.

In an embodiment, the term "advertising channels" refers to different communication protocols or technologies, such as an HTML/HTTP web browser channel, an email channel, a text message (SMS) channel, an MMS channel, an IP channel, and the like, and does not refer to different content sources or to different advertisement styles.

An advertising campaign in which two or more advertising channels carry coordinated advertising content substantially concurrently may be referred to as a cross-channel advertising campaign. In some cases, a cross-channel advertising campaign may include only one type of advertising channel. For example, a cross-channel advertising campaign may include only application-based channels, such as a browser-based channel and an email-based channel, or only format-based channels, such as a banner advertisement-based channel and a pop-up advertisement-based channel. In other cases, a cross-channel advertising campaign may include a plurality of different types of advertising channels. For example, an email application may be one channel in a cross-channel advertising campaign, and banner advertisements in a web browser may be another channel in the same campaign.

The different advertising channels may have different form factors and different display capabilities. For example, a browser may use a relatively large screen area and be capable of displaying complex graphics. A text message, on the other hand, may appear in a relatively smaller screen area and have only limited capabilities for displaying graphical information.

In an embodiment, a system and method are provided that cause an advertisement created for display in one advertising channel to be automatically converted for display in another advertising channel. That is, an advertisement designed for a first channel may be broken down into its component parts, and the parts may be resized, reformatted, rearranged, removed, and/or otherwise modified according to a set of predefined rules for generating component parts of an advertisement in a second channel. The modified parts may then be assembled according to the rules for the second channel into a format and arrangement appropriate for that channel. The advertisement created for display in the first advertising channel and one or more advertisements converted for display in another advertising channel may be referred to as coordinated advertisements or associated advertisements.

As an example, an advertiser may create an advertisement that is intended for display in a browser and that may contain multiple text portions, still graphics portions, animated graphics portions, and/or other types of media. The advertiser may provide the advertisement to a system that is capable of parsing the content of the advertisement. The advertiser may then use an interface associated with the system to specify another advertising channel in which the advertiser would like the advertisement to appear. The system may automatically convert the browser-oriented content into a format that the other advertising channel can accommodate. For example, if a browser-based advertisement is being converted to a text-based advertisement, the system may automatically remove any graphical information that cannot be supported in a text message and may automatically reformat and reposition the remaining text portions into a form appropriate for a text message.

A modified advertisement generated in this manner may be automatically displayed for inspection by the advertiser. The advertiser may then accept the modified advertisement as is or make any desired revisions to the automatically generated advertisement. If desired, the advertiser may then perform similar actions in converting the original advertisement into forms appropriate for one or more other advertising channels, each of which may have its own set of rules for converting advertising content into a form that is consistent with its capabilities.

In this way, the advertiser may create the content for an advertisement only one time for a single advertising channel. Similar content may then be automatically generated for display across a plurality of advertising channels, thus automatically creating an entire multi-channel or cross-channel advertising campaign with comparable content across all of the channels. This procedure for creating a cross-channel advertising campaign may be contrasted with existing procedures, wherein an advertiser may request a plurality of vendors to create an advertisement for one or more of a plurality of advertising channels. For example, a first vendor may be requested to create a browser-based advertisement, a second vendor may be requested to create an email-based advertisement, and so on.

In an embodiment, the systems and interfaces for assisting an advertiser in creating multiple versions of an advertisement for a cross-channel advertising campaign, in setting and resetting parameters related to the target audiences for the cross-channel advertising campaign, and in observing results of the cross-channel advertising campaign, may be components in an integrated system that may be referred to hereinafter as the cross-channel advertising campaign system. A person or group using such a system to manage a cross-channel advertising campaign may be referred to herein as an advertiser. A person interacting with an advertisement that is transmitted in a channel of a cross-channel advertising campaign and is presented on a mobile communication device or other electronic device may be referred to herein as a user.

FIG. 1 is a block diagram illustrating an embodiment of a cross-channel advertising campaign system 100. An advertiser may create original advertising content 110 in a format that is appropriate for a first advertising channel 120. In this example, the first advertising channel 120 is a channel for web-based content that may appear in a web browser, so the original advertising content 110 may be designed for display in a browser. The advertiser may provide the original advertising content 110 to the cross-channel advertising campaign system 100, perhaps by copying one or more digital files or in some other manner. The advertiser may also specify one or more additional channels 130 via which similar advertising content is to be delivered as part of a cross-channel advertising campaign. In this example, the advertiser has specified that the additional channels 130 are an email channel 130a, a text channel 130b, an IP channel 130c, and an in-home channel 130d. In other embodiments, fewer additional channels 130 or other additional channels 130 may be specified.

In an embodiment, the cross-channel advertising campaign system 100 automatically converts the original advertising content 110 into similar content that is formatted appropriately for the additional advertising channels 130. For example, the cross-channel advertising campaign system 100 may convert the original advertising content 110 to a first converted advertising content 140a appropriate for display in the email channel 130a, a second converted advertising content 140b appropriate for display in the text channel 130b, a third converted advertising content 140c appropriate for display in the IP channel 130c, and a fourth converted advertising content 140d appropriate for display in the in-home channel 130d.

The cross-channel advertising campaign system 100 may perform such conversions by disassembling the original advertising content 110 into a plurality of components, such as one or more animated graphics components, one or more still graphics components, and one or more text components. The components may then be modified according to a set of rules predefined for each of the additional channels 130. The modified components may then be reassembled according to the rules for each of the additional channels 130 into a format that is appropriate for the respective channels.

The cross-channel advertising campaign system 100 may determine a format that is appropriate for one of the additional channels 130 by comparing the display capabilities and characteristics of a first channel that may carry the original advertising content 110 to the display capabilities and characteristics of a second channel that may carry converted advertising content 140. Such capabilities and characteristics may include the capability to display animated graphics, the capability to display still graphics, the sizes of the display screens in each of the channels, the number of pixels in the display screens in each of the channels, the aspect ratios of the display screens in each of the channels, and other related parameters. Taking into account the results of such a comparison and the differences in the capabilities and characteristics of the first advertising channel and the second advertising channel, the cross-channel advertising campaign system 100 may take appropriate actions to convert the content from one format to another. For example, the cross-channel advertising campaign system 100 may remove from the original advertising content 110 graphics and other items that cannot be accommodated in the second channel, may resize, reformat and/or reposition graphics or text, and may take any other actions necessary such that the converted content 140 has a format appropriate for the second channel and retains as much of the original content 110 as can be accommodated in the second channel.

As an example, if the original advertising content 110 is designed for the browser channel 120, the content may include animated graphics, still graphics, text, and other types of media. Some of this content may not be compatible with, for instance, the text channel 130b. Thus, when the cross-channel advertising campaign system 100 converts the original advertising content 110 to the second converted advertising content 140b for display in the text channel 130b, the cross-channel advertising campaign system 100 may remove any content, such as graphics, that cannot be displayed in the text channel 130b. The cross-channel advertising campaign system 100 may also resize, reformat, and reposition any text so that the text appears in the typical form of a text message. The cross-channel advertising campaign system 100 may perform similar automatic conversions for all of the other additional channels 130 in a cross-channel advertising campaign.

In an embodiment, after converting the original advertising content 110 to one of the converted advertising contents 140, the cross-channel advertising campaign system 100 may display one or more versions of the converted content 140 for review by the advertiser. That is, for any one of the additional channels 130, the converted content 140 may be displayed in a plurality of different forms. For example, a banner advertisement in the original advertising content 110 may be displayed in one of the converted advertising contents 140 in a first version as a banner advertisement with a different size, in a second version as a side-bar advertisement, and in a third version as a plain text advertisement. As another example, a text-only advertisement in the original advertising content 110 may be displayed in one of the converted advertising contents 140 in one version as text in a first position with a first size and in another version as text in a second position with a second size. Similar displays of multiple versions of converted content 140 may be provided for each of the channels in a cross-channel advertising campaign.

If the advertiser is satisfied with the appearance of one of the versions of the converted content 140, the advertiser may allow that version of the converted content 140 to be delivered via its corresponding channel 130 without revision. If the advertiser is not satisfied with the appearance of any of the versions of the converted content 140, the advertiser may revise one of the versions before releasing the converted content 140 for delivery. In this way, the cross-channel advertising campaign system 100 may greatly reduce the amount of work the advertiser performs in creating a cross-channel advertising campaign. Rather than designing separate advertisements for each of the channels in the cross-channel advertising campaign, the advertiser may design only one advertisement and then may make modifications, if necessary, to the automatically generated versions of that advertisement.

An advertiser may keep the behavior of the cross-channel advertising campaign system 100 in mind when designing the original advertising content 110. That is, the advertiser may know that the cross-channel advertising campaign system 100 may create simpler converted advertising content 140 from more complex original advertising content 110. The advertiser may therefore design the original advertising content 110 to have the largest size, most complexity, and most content compared to the advertisements that are expected to be automatically generated. Different portions of the original advertising content 110 may then be removed, simplified, or shrunk as appropriate for each of the additional channels 130.

In some cases, the advertiser may wish for one or more portions of the original advertising content 110 to appear in one or more of the converted contents 140 regardless of the conversion rules for the converted contents 140. In an embodiment, the cross-channel advertising campaign system 100 may allow the advertiser to specify any such portions and may cause those portions to appear in the converted contents 140 even if the rules would otherwise cause the portions to be removed. For example, if browser-based content is being converted to text-based content, the rules may specify that all graphics are to be removed from the browser-based content. If the advertiser specifies that a graphical portion of the browser-based content is to be retained if possible, the cross-channel advertising campaign system 100 may extract any text from the specified graphic portion, reformat the extracted text if necessary, and include the extracted text in the text-based content. As another example, several graphical images may appear in the original advertising content 110. If the advertiser wishes to ensure that one of the images appears in the converted content 140 regardless of the conversion rules, the advertiser may designate that image as the primary image. The cross-channel advertising campaign system 100 may cause an image designated as the primary image to appear in the converted content 140 even if the rules would have otherwise called for that image to be removed.

A user may communicate via a plurality of different communication protocols or channels, each of which may be associated with one or more different identifiers, references, or addresses. For example, the user may have a telephone number, an SMS address, an email address, an IP address, a domain name, and/or other identifiers, any of which may be referred to herein as an address. In an embodiment, as part of the procedure for converting advertising content from a form appropriate for one advertising channel to a form appropriate for another advertising channel, the cross-channel advertising campaign system 100 may associate an address on one advertising channel and an address on another advertising channel to the same user and may use the appropriate address for each channel when sending advertising content to the user. That is, the cross-channel advertising campaign system 100 may have access to information specifying a plurality of different addresses associated with each of a plurality of users. When sending advertising content to a group of users via a plurality of advertising channels, the cross-channel advertising campaign system 100 may use the addresses appropriate for each of the channels for each of the users in the group. For example, if coordinated advertisements are to be sent to the members of a group via both the email channel 130a and the text channel 130b, the cross-channel advertising campaign system 100 may be aware of and may use each member's email address when sending the advertising content via the email channel 130a and may be aware of and may use each member's SMS address when sending the advertising content via the text channel 130b. Different addresses may be associated with a single user by mapping all of the addresses to single identifier associated with the user or by mapping the addresses to one another and mapping at least one of the addresses to the user.

As described in more detail below, the cross-channel advertising campaign system 100 may include a plurality of interfaces 150 that can assist an advertiser in creating and managing a cross-channel advertising campaign. The cross-channel advertising campaign system 100 may also include a processor 160 and related components capable of converting advertising content from one format to another. The processor 160 may perform the conversion by following a set of conversion rules 170 for each channel.

The cross-channel advertising campaign system 100 may also include or have access to a database 180 or similar data repository containing demographic data for users who may receive content provided over one or more of the channels. Such demographic data may assist the advertiser in using the cross-channel advertising campaign system 100 to target a cross-channel advertising campaign to one or more subsets of a larger group. For example, the demographic data database 180 may contain information about the advertiser's customers, and the advertiser may use the information in the demographic data database 180 to target advertisements to a subset of its customers. The demographic data database 180 may also include information that maps a plurality of addresses to a single user, as described above.

As mentioned above, the cross-channel advertising campaign system 100 may also assist an advertiser in setting various parameters related to the target audiences for a cross-channel advertising campaign and in observing results related to the effectiveness of the cross-channel advertising campaign. For example, the system 100 may present a graphical display interface that allows the advertiser to specify demographic information, such as age, gender, income, and/or geographic location, for the target audiences for a plurality of advertising channels. Different demographic information may be specified for each of the audiences targeted in each of the advertising channels. Once the cross-channel advertising campaign has been launched, the system 100 may present a graphical display interface that shows how effectively the advertisements in each of the channels are reaching their target audiences and inducing responses from the members of the targeted audiences.

Figure 2:
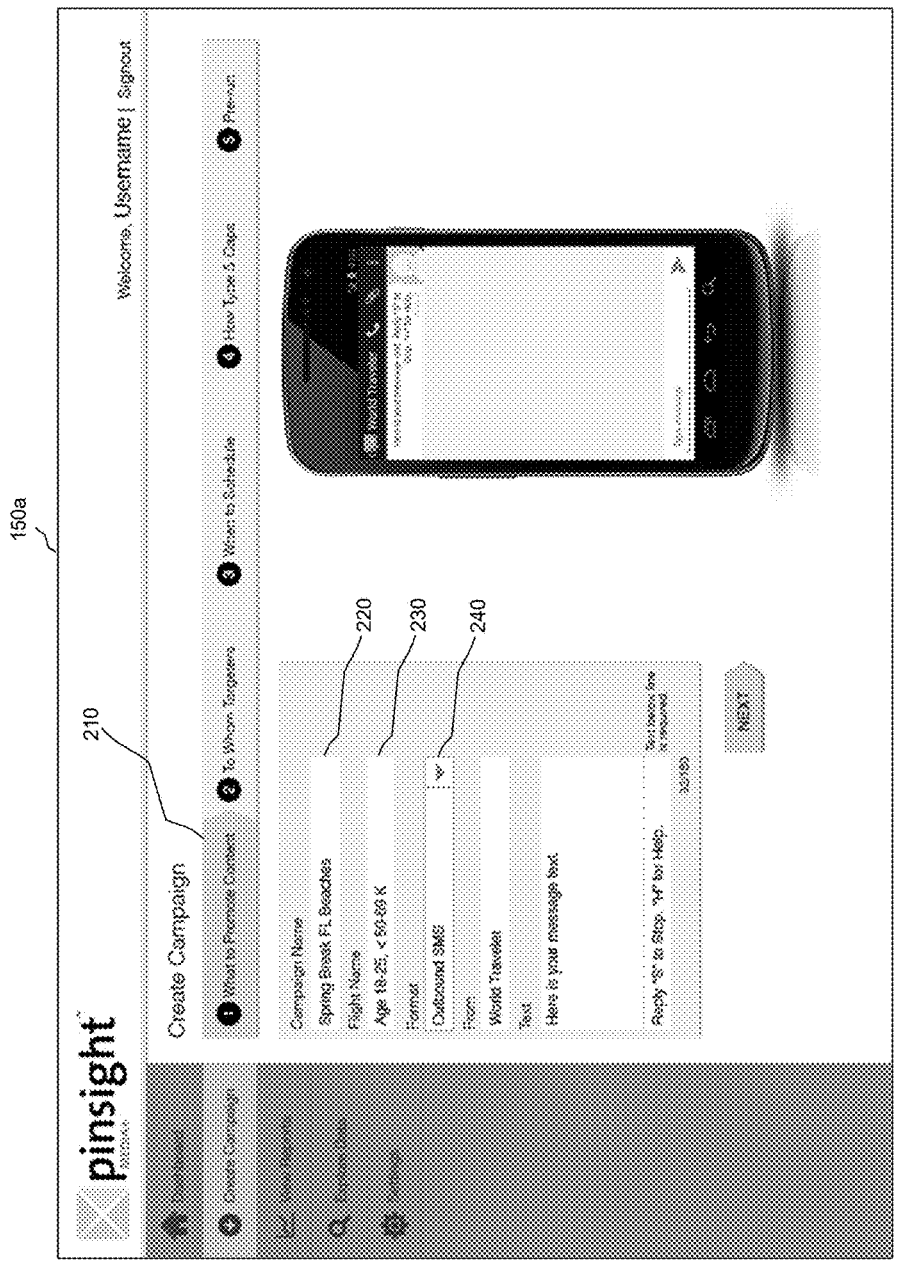
FIG. 2 is an illustration of an interface in a cross-channel advertising campaign system according to an embodiment of the disclosure.

FIG. 2 illustrates an example of an interface 150a in the cross-channel advertising campaign system 100 that may assist an advertiser in creating a cross-channel advertising campaign. This illustration and the following interface illustrations are intended to depict examples of the types of graphical objects and means for data input and output that may appear in the interfaces 150 of the cross-channel advertising campaign system 100, but the items that may appear in such interfaces 150 are not limited to those illustrated. The items may have a different appearance and/or additional or alternative items may be present. Additional or alternative interfaces 150 may be present in the cross-channel advertising campaign system 100 as well.

When a first tab 210 in the interface 150a is selected, a screen may appear that allows an advertiser to enter or select parameters related to the creation of a cross-channel advertising campaign. In this example, the advertiser may enter a campaign name in a campaign name entry box 220. In this case, the campaign name is "Spring Break FL Beaches". The advertiser may also enter a flight name, which may indicate demographic information for the audience toward which the cross-channel advertising campaign is targeted, in a flight name entry box 230. In this case, the flight name is "Age 18-25, <50-69 K", which may indicate that the campaign is directed toward people from 18 to 25 years old with an annual salary up to $69,000. The advertiser may also select a format or channel for this portion of the cross-channel advertising campaign in a format drop-down list 240 or similar data entry mechanism. In this case, the format is selected to be "Outbound SMS", which indicates that content for this portion of the cross-channel advertising campaign is to be delivered via the text messaging channel.

In an embodiment, after entering information such as that above into the interface 150a, the advertiser may select another format from the format drop-down list 240 in order to specify an additional channel via which similar advertising content is to be delivered as part of the cross-channel advertising campaign. The advertiser may then provide similar information for the additional channel. The advertiser may continue selecting formats and providing parameters for the formats until parameters for all of the channels in the cross-channel advertising campaign have been specified.

Figure 3:
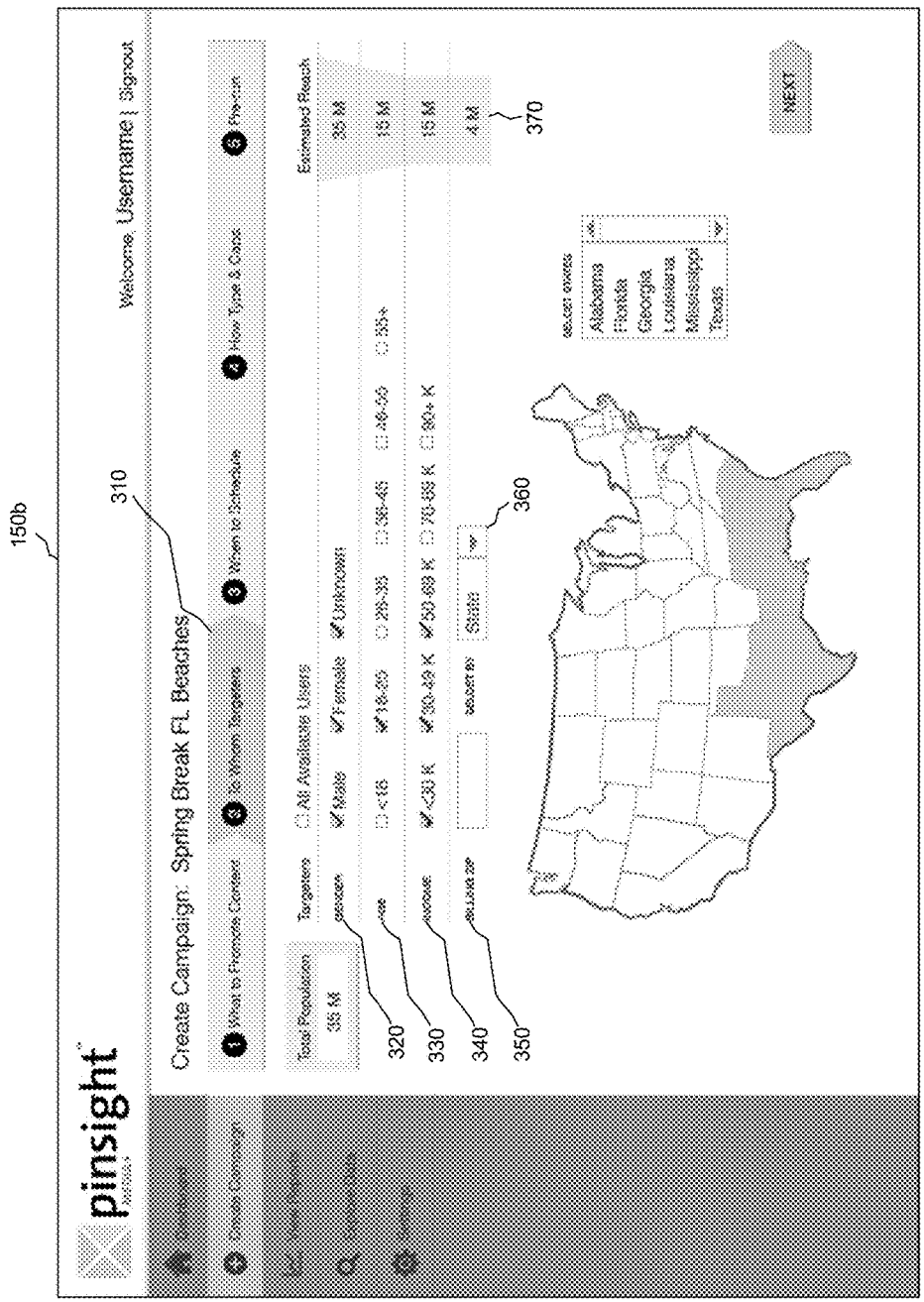
FIG. 3 is an illustration of another interface in a cross-channel advertising campaign system according to an embodiment of the disclosure.

FIG. 3 illustrates an example of an interface 150b in the cross-channel advertising campaign system 100 that may assist an advertiser in specifying demographic parameters for a target audience for a cross-channel advertising campaign. When a second tab 310 in the interface 150b is selected, a screen may appear that allows an advertiser to enter or select demographic information for a target group. The demographic information may be obtained from the demographic data database 180 of FIG. 1.

A first set of check boxes 320 is present for selecting the gender of the target group, and in this case male, female, and unknown genders have been selected. A second set of check boxes 330 is present for selecting the age range of the target group, and in this case a range of 18 to 25 years has been selected. A third set of check boxes 340 is present for selecting the income range of the target group, and in this case the income ranges of less than $30,000, $30,000 to $49,000, and $50,000 to $69,000 have been selected. Means for specifying a geographic area in which the advertiser wishes the cross-channel advertising campaign to occur are also provided in the interface 150b. The advertiser may specify the geographic extent of the campaign by entering a zip code in a billing zip code data entry box 350 or by selecting one or more states from a state drop-down list 360. In this case, the states of Texas, Louisiana, Mississippi, Alabama, Georgia, Florida, and South Carolina have been selected. In other embodiments, other types of demographic information may be specified. The interface 150b also includes an Estimated Reach column 370 that dynamically displays the number of users expected to be targeted by each of the currently selected demographic parameters. The values in the Estimated Reach column 370 may change as different values are specified for the parameters displayed in the interface 150b.

Figure 4:
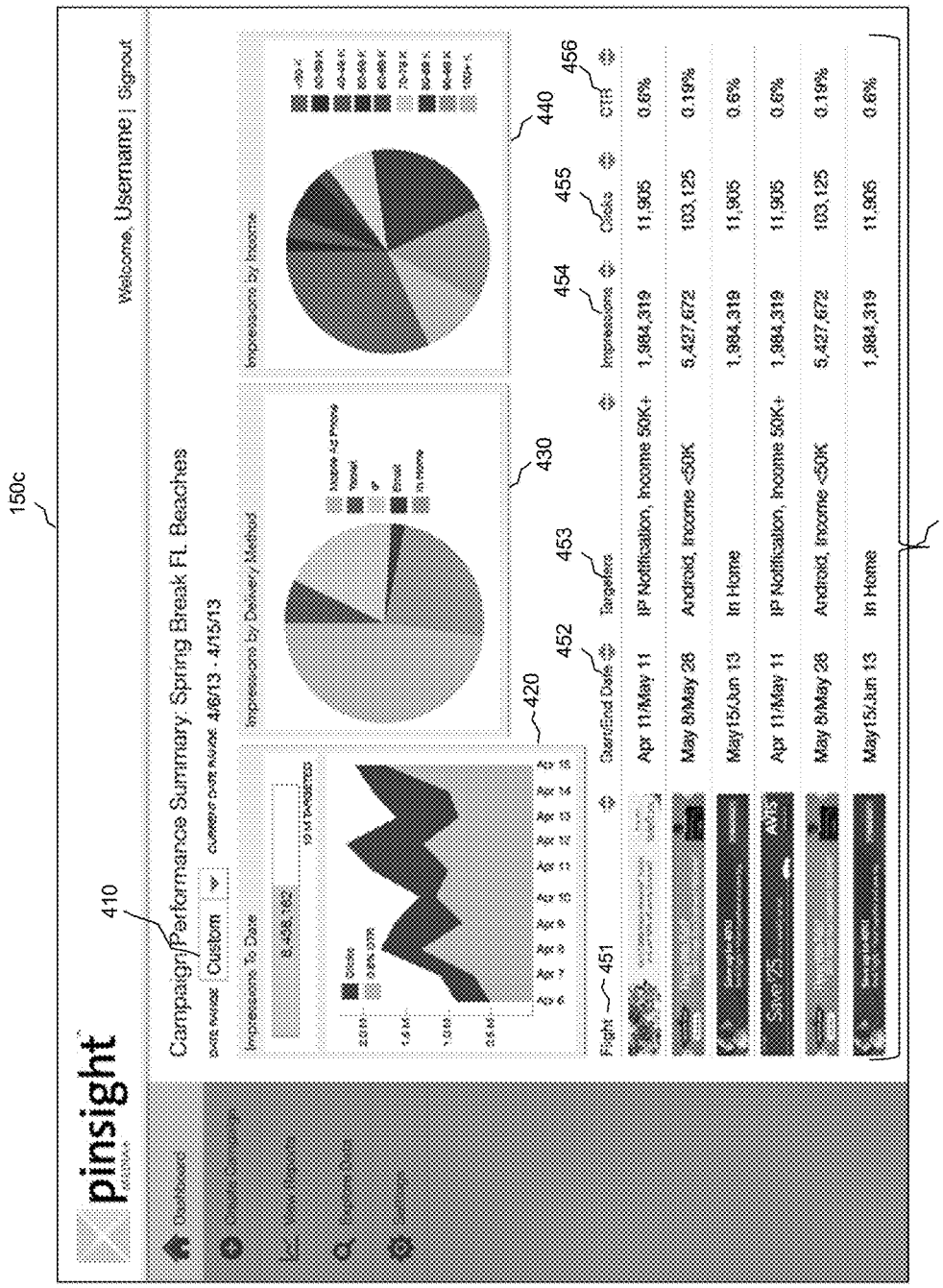
FIG. 4 is an illustration of another interface in a cross-channel advertising campaign system according to an embodiment of the disclosure.

FIG. 4 illustrates an example of an interface 150c in the cross-channel advertising campaign system 100 that may display performance results for a cross-channel advertising campaign. FIG. 4 is intended merely as a mock-up of such a display of results, and the numerical values shown in the figure are intended merely as placeholders to illustrate where actual values may appear in an actual display. The values do not represent actual results information.

A date range drop-down list 410 allows an advertiser to specify a date range for which campaign performance results are desired. A first chart 420 in the interface 150c shows the total number of impressions that have occurred to date in the cross-channel advertising campaign. The number of impressions may be defined as the number of times an advertisement is displayed, the number of times a browser requests an advertisement from a web server, the number of times an advertisement is loaded into a browser, or some other, similar value familiar to those of skill in the art of multimedia advertising.

A second chart 430 in the interface 150c shows the number of impressions to date by delivery method. That is, the second chart 430 provides a graphical representation of the number of impressions that have occurred in each of the channels in the cross-channel advertising campaign. A third chart 440 in the interface 150c shows the number of impressions to date by income. That is, the third chart 440 provides a graphical representation of the number of impressions that have been provided to users in each of a plurality of income ranges.

A fourth chart 450 in the interface 150c shows information for a plurality of different flights that are part of the cross-channel advertising campaign. For each flight in a flight column 451, the fourth chart 450 shows the start and end date of the flight in a date column 452, the targeted audience in a targeters column 453, the number of impressions to date in an impressions column 454, the number of clicks to date in a clicks column 455, and the click-through rate (CTR) in a CTR column 456. The number of clicks may represent the number of responses users have made to an advertisement by performing a mouse click on the advertisement, but users may respond to an advertisement with actions other than mouse clicks. For example, user responses may include making a telephone call to a number that appears in an advertisement, texting to a number that appears in an advertisement, entering information into a form that appears in an advertisement, playing a game that appears in an advertisement, or some other type of response. Any user response to an advertisement that may be detected by an advertiser may be referred to more generically as an action. Thus, the clicks column 455 may be referred to more generically as an "actions" column. The CTR may be defined as the number of times users have clicked on an advertisement divided by the number of impressions of the advertisement, but again, the users may respond to an advertisement in other manners than mouse clicks. Thus, the CTR column 456 may be referred to more generically as an "action rate" column.

In other embodiments, the information depicted in FIG. 4 may be displayed in other manners, and other types of information related to the results of a cross-channel advertising campaign may be displayed. Such information may be displayed on a single interface 150 or on a plurality of interfaces 150.

As mentioned above, the cross-channel advertising campaign system 100 may also assist an advertiser in resetting the parameters related to the target audiences for a cross-channel advertising campaign. For example, the cross-channel advertising campaign system 100 may present a graphical interface 150 indicating how many actions users have taken in response to an advertisement transmitted via a first advertising channel and how many actions users have taken in response to a comparable advertisement transmitted via a second advertising channel. If the response appears greater in one of the advertising channels than in the other, the advertiser may wish to refocus the cross-channel advertising campaign toward the channel with the greater response.

In an embodiment, the cross-channel advertising campaign system 100 may display on a graphical interface 150 a graphical object containing a first component whose size represents the number of impressions the advertiser has targeted for an advertisement in an advertising channel, a second component whose size represents the actual number of impressions for the advertisement in that advertising channel, and a third component whose size represents the number of actions a user has taken in response to the advertisement in that advertising channel. One such object may be displayed for each of the channels in the cross-channel advertising campaign.

The cross-channel advertising campaign system 100 may allow the advertiser to manipulate the size of the first component in such a graphical object. A change in the size of the first component may act as an input command that may be automatically translated into a corresponding change in the targeted number of impressions for an advertisement in the advertising channel corresponding to that graphical object. The interface 150 may allow the advertiser to associate a plurality of such graphical objects with one another such that an increase or decrease in the size of the first component in one object automatically results in a corresponding increase or decrease in the size of the first component in another object. Corresponding changes may then automatically occur in the targeted number of impressions for the advertisement in the respective advertising channels.

For example, an advertisement may originally be targeted for an equal number impressions in the email channel 130a and the text channel 130b. If the response to the email version of the advertisement is greater than the response to the text message version, the advertiser may wish to refocus the cross-channel advertising campaign toward the email channel 130a. If the advertiser wishes, for instance, to double the targeted number of impressions in the email channel 130a and halve the targeted number of impressions in the text channel 130b, the advertiser may select both an email graphical object and a text message graphical object in an interface 150. The advertiser may then manipulate the size of the first component in the email graphical object such that its area is doubled. The cross-channel advertising campaign system 100 may then automatically double the number of impressions targeted via the email channel 130a. Numerical values may appear in the interface 150 to indicate the size of the first component and/or the corresponding number of targeted impressions. The cross-channel advertising campaign system 100 may also automatically reduce the size of the first component in the text message graphical object by half and halve the number of targeted impressions via the text channel 130b.

Figure 5:
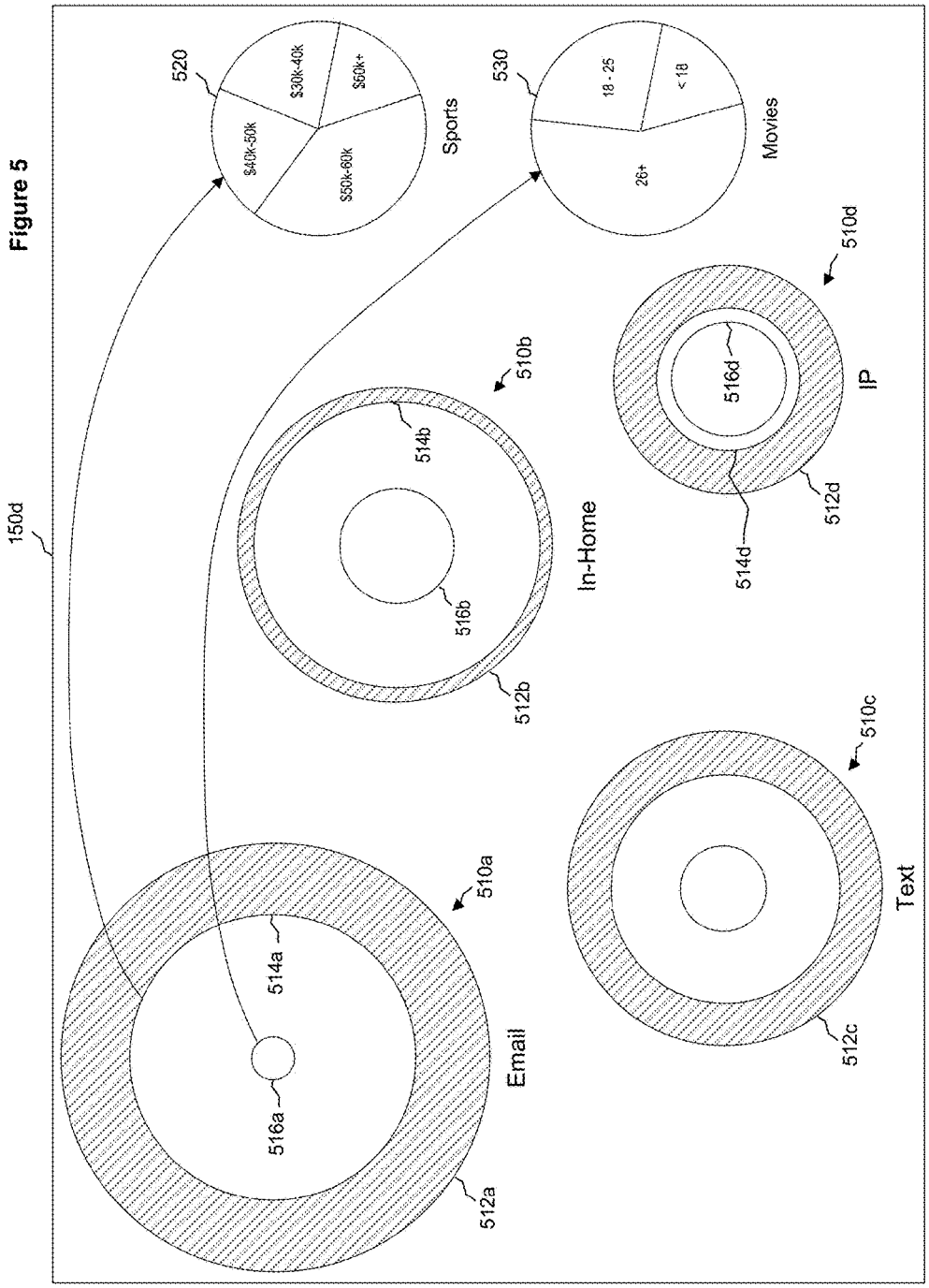
FIG. 5 is an illustration of another interface in a cross-channel advertising campaign system according to an embodiment of the disclosure.

FIG. 5 illustrates an example of an interface 150d in the cross-channel advertising campaign system 100 that may be used for displaying performance results for a cross-channel advertising campaign in an alternative manner to that in FIG. 4. This interface 150d may also be used to assist an advertiser in modifying parameters related to an ongoing cross-channel advertising campaign. That is, the advertiser may enter control inputs into the system 100 via the interface 150d in order to reset previously specified parameters. In this example, information is shown only for the email channel, the in-home channel, the text channel, and the IP channel, but in other embodiments information for different channels or additional channels may be shown.

Each of a plurality of graphical objects 510 symbolizes information related to one of the channels in a cross-channel advertising campaign. In this example, information is symbolized by concentric circles, but in other embodiments other shapes could be used. Each circle in one of the graphical objects 510 represents a parameter related to the cross-channel advertising campaign. Taking the email object 510a as an example, the size of a first circle 512a may represent the number of impressions targeted via the email channel. The size of a second circle 514a may represent the number of impressions actually recorded via the email channel through a specified time. The size of a third circle 516a may represent the number of actions, such as mouse clicks, that users have taken on the recorded impressions through a specified time. The specified times may be approximately the present time or some previous time specified by the advertiser. Equivalent circles may represent equivalent values in the other graphical objects 510.

In an embodiment, equivalent circles in the email object 510a, in-home object 510b, text object 510c, and IP object 510d use the same units, so the sizes of corresponding circles may be directly compared to one another, and differences in size may indicate corresponding differences in corresponding values. In some cases, a logarithmic scale or some other type of non-linear scale may be used to make the circle sizes more easily comparable.

For example, the first circle 512a of the email object 510a is larger than the first circle 512b of the in-home object 510b, the first circle 512c of the text object 510c, and the first circle 512d of the IP object 510d. This indicates that more impressions have been targeted via the email channel than via any of the other channels. Similarly, the third circle 516b of the in-home object 510b is substantially the same size as the third circle 516d of the IP object 510d. This indicates that the number of actions taken on impressions in the in-home channel is substantially the same as the number of actions taken on impressions in the IP channel. Equivalent relationships are implied by the relative sizes of other corresponding circles.

Within one of the graphical objects 510, the progress toward meeting the targeted number of impressions may be indicated by the relative sizes of the first circle 512 and the second circle 514. A large second circle 514 compared to a first circle 512 indicates that the target has nearly been met, while a small second circle 514 compared to a first circle 512 indicates that the target is far from being met. For example, in the in-home object 510b, the second circle 514b is almost the same size as the first circle 512b, indicating that the number of impressions in the in-home channel has almost met the targeted value for that channel. By contrast, in the IP object 510d, the second circle 514d is significantly smaller than the first circle 512d, indicating that the number of impressions in the IP channel is far from the targeted value for that channel. The difference between a targeted number of impressions and an actual number of impressions is indicated by a hatched area between a first circle 512 and a second circle 514. If the actual number of impressions exceeds the targeted number of impressions, the second circle 514 will be larger than the first circle 512, and a different style of hatching may be used to indicate such a situation.

Also, within one of the graphical objects 510, the success of the cross-channel advertising campaign in inducing users to perform an action on an impression may be indicated by the relative sizes of the second circle 514 and third circle 516. A large third circle 516 compared to a second circle 514 indicates that a relatively large portion of users have taken an action on an impression, while a small third circle 516 compared to a second circle 514 indicates that a relatively small portion of users have taken an action on an impression. For example, in the email object 510a, the third circle 516a is significantly smaller than the second circle 514a, indicating that relatively few actions have been taken on the impressions that have occurred in that channel. By contrast, in the IP object 510d, the third circle 516d is almost the same size as the second circle 514d, indicating that users have taken actions on a large portion of the impressions that have occurred in that channel. It may thus be inferred that the IP channel has been more successful than the email channel in inducing users to take actions on impressions.

In an embodiment, the graphical objects 510 in the interface 150d are not merely static displays of data but may instead be interactive displays via which demographic information related to users of an advertising channel may be obtained. That is, an advertiser may be able to perform a mouse click on one of the objects 510, select a menu item related to one of the objects 510, or perform some other, similar action on one of the objects 510 to select one of the circles in an object 510. The advertiser may select a first circle 512 to obtain demographic information about targeted users, may select a second circle 514 to obtain demographic information about users to whom impressions have been displayed, and may select a third circle 516 to obtain demographic information about users who have performed an action on an impression. After selection of one of the circles, the advertiser may select one or more categories of demographic information related to the selected circle. Responsive to the selection of a category, the selected demographic information for the selected advertising channel and selected type of circle may then appear in the interface 150d or in another interface 150. Alternatively, a category of demographic information may be selected first, and then one of the circles may be selected to specify the advertising channel and type of data for which demographic information is desired.

The categories of demographic information may include age, gender, income, geographic location, browser history, behavioral characteristics such as interests or hobbies, or other demographic data. In an embodiment, two or more categories of demographic information may be combined to define a narrower set of the users. For example, the number of users in a specified age group and within a specified salary range may be requested by an advertiser and displayed in the interface 150d.

A second graphical object 520 provides an example of such a display of demographic information. In this example, the second graphical object 520 is a pie chart, but the second graphical object 520 could take other forms. In this case, an advertiser has selected the second circle 514a of the email object 510a, meaning that the advertiser is interested in demographic information related to users to whom impressions have been displayed via the email channel. Responsive to this selection, the interface 150d may provide the advertiser with some means for selecting which types of demographic information the advertiser wishes to view within that group. In this case, the advertiser has specified a desire to view the number of impressions within each of a plurality of salary ranges for users with an interest in sports. Responsive to this specification of demographic information, the second graphical object 520 appears in the interface 150d and represents the number of users to whom an impression has been displayed via the email channel and who have indicated an interest in sports. Within that group, the number of impressions is broken down into a plurality of salary ranges. The number of impressions in each salary range may be explicitly displayed in or near the second graphical object 520 or may be implicitly indicated by the relative sizes of the slices within the pie chart.

A third graphical object 530 provides another example of such a display of demographic information. In this case, an advertiser has selected the third circle 516*a* of the email object 510*a*, meaning that the advertiser is interested in demographic information related to users who have performed an action in response to an impression in the email channel. The interface 150*d* may then provide the advertiser with some means for selecting the types of demographic information to be viewed within that group. In this case, the advertiser has specified a desire to view the number of actions within each of a plurality of age groups for persons who have expressed an interest in movies. Responsive to this specification, the third graphical object 530 appears in the interface 150*d* and represents the number of people who have performed an action in response to an impression in the email channel and who have indicated an interest in movies. Within that group, the number of actions is broken down into a plurality of age groups.

While the second graphical object 520 and the third graphical object 530 are shown displaying data associated with a single advertising channel, namely data represented by the email graphical object 510*a*, the second graphical object 520 and third graphical object 530, and possibly additional such objects, may display data associated with two or more different advertising channels. For example, an advertiser may select the first circle 512*a* of the email graphical object 510*a* and the first circle 512*b* of the in-home graphical object 510*b* to see a comparison of demographic data for targeted users in the email channel and targeted users in the in-home channel.

In an embodiment, the size of a demographics-related graphical object, such as the second graphical object 520 or the third graphical object 530, may be indicative of the relative size of a demographic category compared to a larger category of information. For example, an advertiser may request to see the number of users under the age of 18 who have performed an action on an impression in a particular channel, as indicated by the third circle 516 of an object 510. If the number of such users happens to be half the number of all users who have performed an action on an impression in that channel, then the size of the demographics-related graphical object may be half the size of the third circle 516 in that object 510.

Alternatively, the size of a demographics-related graphical object may not be related to the size of a larger category of information, but the relative sizes of a plurality of such objects may indicate the relative sizes of a plurality of demographic groups. For example, an advertiser may request to see a graphical object representing the number of users under the age of 18 who have performed an action on an impression in a particular channel and may request to see another graphical object representing the number of users 18 and over who have performed an action on an impression in that channel. If the number of users in the first group happens to be twice as large as the number of users in the second group, the former graphical object may appear in the interface 150*d* with a size twice as large as that of the latter graphical object.

While not shown in the interface 150*d*, it may be possible to select the second graphical object 520 and/or the third graphical object 530 to obtain demographic information at an even more detailed level than that depicted in the second graphical object 520 and the third graphical object 530. For example, one of the slices in the pie chart in the second graphical object 520 may be selected to break a salary range down further by age group or some other parameter. One manner of selecting such an object may allow drilling down into deeper and deeper layers of demographic information, while another manner of selecting such an object may reverse such an action and show less detailed information. Also, while the second graphical object 520 and the third graphical object 530 are shown in the interface 150*d* together with the graphical object 510 from which they are derived, the second graphical object 520 and the third graphical object 530 may instead replace that graphical object 510 in the interface 150*d*.

In an embodiment, manipulating the size of the graphical objects 510 in the interface 150*d* may act as a control input to the system 100 that may cause a corresponding adjustment of one or more of the parameters that were previously specified for a cross-channel advertising campaign. More specifically, an advertiser may adjust the size of one of the first circles 512 that represents the number of impressions targeted in a channel. A corresponding adjustment is then automatically made to the actual number of impressions targeted in that channel. The size adjustment may be made by stretching or shrinking the first circle 512 using a mouse click-hold-and-drag technique or some other technique that has a similar effect. A numerical value may appear in the interface 150*d* to indicate the extent of the adjustment and assist the advertiser in specifying a desired value for the adjusted parameter. The value may be the actual numbers of impressions targeted or a percentage of increase or decrease in the number of impressions targeted.

For example, if an advertiser wishes to increase by 10% the number of impressions targeted via the email channel, the advertiser may increase by 10% the size of the first circle 512*a* of the email object 510*a*. Similarly, if an advertiser wishes to decrease by 1000 the number of impressions targeted via the IP channel, the advertiser may decrease the size of the first circle 512*d* of the IP object 510*d* until a decrease of 1000 impressions is indicated in the interface 150*d*. The second circles 514 and third circles 516 may not be adjustable in this manner since those circles represent measured values rather than specified parameters.

In an embodiment, the first circles 512 in two or more of the graphical objects 510 may be selected and adjusted concurrently, such that a change in the size of one selected first circle 512 causes a change in the size of the other selected first circle 512. Changes in the sizes of the first circles 512 cause corresponding changes in the numbers of users targeted in the channels associated with those first circles 512. The changes of size may be specified quantities or specified percentages. Values may appear in the interface 150*d* indicating the amounts of change.

The concurrent adjustments may occur in either a complementary manner or a contradictory manner. That is, in some cases, an increase or decrease in the size of a selected first circle 512 in one graphical object 510 may result in a corresponding increase or decrease in the size of a concurrently selected first circle 512 in another graphical object 510. In other cases, an increase in the size of one selected first circle 512 may result in a corresponding decrease in the size of a concurrently selected first circle 512 or a decrease in the size of one selected first circle 512 may result in a corresponding increase in the size of a concurrently selected first circle 512. The latter cases may be particularly useful when an advertiser wishes to adjust the focus of a cross-channel advertising campaign "on the fly".

For example, an advertiser may view the interface 150*d* to gauge the effectiveness of an ongoing cross-channel advertising campaign. The advertiser may observe that the email channel does not appear to be particularly effective, as indicated by the fact that the third circle 516*a* representing the number of actions is small compared to the second circle 514*a* representing the number of impressions. The advertiser may further observe that the IP channel does appear to be effective, as indicated by the fact that the third circle 516*d* representing the number of actions is almost as large as the second circle 514*d* representing the number of impressions, thus indicating that a large proportion of users who view an impression via the IP channel take an action in response to that impression. These facts may motivate the advertiser to refocus the cross-channel advertising campaign more toward the IP channel and away from the email channel by increasing the number of impressions targeted via the IP channel and decreasing the number of impressions targeted via the email channel.

To do so, the advertiser may concurrently select both the first circle 512*a* in the email object 510*a* and the first circle 512*d* in the IP object 510*d*. The advertiser may then specify or confirm that an increase in the size of one of the selected first circles 512 is to result in a corresponding decrease in the size of the other of the selected first circles 512 and vice versa. The advertiser may then, for instance, increase the size of the first circle 512*d* of the IP object 510*d* by a particular number of targeted impressions or by a particular percentage. As a result of this increase, the cross-channel advertising campaign system 100 may automatically decrease the size of the first circle 512*a* of the email object 510*a* by a corresponding number of targeted impressions or by a corresponding percentage. The cross-channel advertising campaign system 100 may also automatically make corresponding adjustments to the actual numbers of targeted impressions in the email channel and the IP channel. Alternatively, the advertiser may specify an increase in one channel and a decrease in another channel, and the increase and decrease may not have the same amount or percentage.

Increasing the number of impressions targeted in a channel may increase the cost of a cross-channel advertising campaign, and the cost increases may be different for different channels. For example, adding 100,000 to the number of impressions targeted via the email channel may cost more than adding 100,000 to the number of impressions targeted via the text channel. In an embodiment, budget-related information may appear in the interface 150*d* to assist an advertiser in adjusting a targeted number of impressions. The information may show a total budget for a cross-channel advertising campaign, a budget per channel, an increase in cost that may occur as the result of a proposed increase in a targeted number of impressions, whether such an increase in cost will exceed a budget, and similar information. Such information may be displayed for a plurality of channels. The interface 150*d* may allow the advertiser to experiment with various budget and target scenarios to attempt to discover a combination that optimizes the effectiveness of the cross-channel advertising campaign while remaining within a budget.

The above discussion has focused on adjusting the total number of impressions targeted in a channel based on the total number of actions in that channel. However, the adjustments may be made on a narrower basis by taking demographic information into account. That is, an advertiser may request to see graphical objects that show the number of actions per impression for each of two or more narrow demographic groups. If the action per impression rate is significantly higher in one group than another, the advertiser may refocus the targeted number of impressions toward the group with the higher rate. For example, if the action per impression rate in the email channel for males under 18 with an interest in sports is significantly greater than the rate in that channel for females under 18 with an interest in movies, the advertiser may increase the targeted number of impressions in the former group and decrease the targeted number of impressions in the latter group. To do so, the advertiser may use techniques similar to those described above to change the sizes of one or more demographics-related graphical objects and bring about corresponding changes in the number of impressions targeted to one or more demographic groups.

Figure 6:
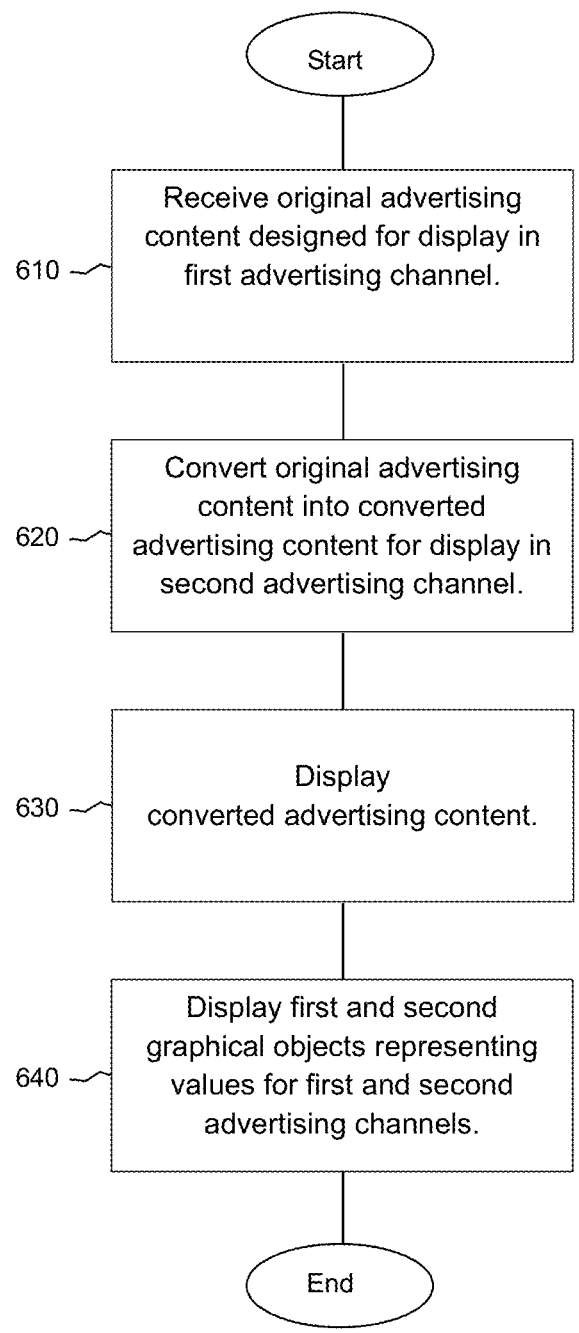
FIG. 6 is a flow chart illustrating a method for a cross-channel advertising campaign system to manage a cross-channel advertising campaign according to an embodiment of the disclosure.

FIG. 6 is a flowchart illustrating an embodiment of a method for managing a cross-channel advertising campaign. The actions in the flowchart may be taken by various components in the cross-channel advertising campaign system 100. At block 610, original advertising content designed for display in a first advertising channel is received. At block 620, the original advertising content is converted into converted advertising content for display in a second advertising channel. At block 630, the converted advertising content is displayed for inspection by an advertiser. At block 640, a first graphical object and a second graphical object are displayed. The sizes of components in the first graphical object and the second graphical object may represent values associated with the first advertising channel and the second advertising channel, respectively.

Figure 7:
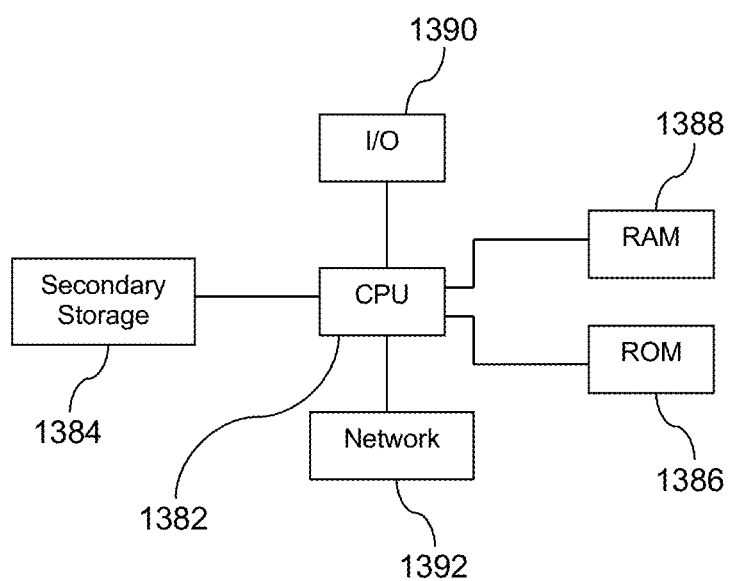
FIG. 7 illustrates an exemplary general purpose computer system suitable for implementing the several embodiments of the disclosure.

FIG. 7 illustrates a computer system 1380 suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 1388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input or output devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1392 may enable the processor 1382 to communicate with the Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing a cross-channel advertising campaign, the method comprising:
   receiving, via a first interface on a computing system, original advertising content designed for display in a first advertising channel;
   converting, by a processor in the computing system, original advertising content into converted advertising content for display in a second advertising channel when at least one difference exists in a characteristic of the first advertising channel and a characteristic of the second advertising channel, the characteristics including at least one of:
      a capability to display animated graphics;
      a capability to display still graphics;
      a size of a display screen;
      a number of pixels in a display screen; or
      an aspect ratio of a display screen;
   displaying, in a second interface on the computing system, the converted advertising content; and
   displaying, in a third interface on the computing system, a first graphical object and a second graphical object, wherein sizes of components in the first graphical object and the second graphical object represent values associated with the first advertising channel and the second advertising channel, and wherein a size of a first component in the first graphical object represents a number of impressions targeted to occur in the first advertising channel;
   receiving a modification to the size of the first component in the first graphical object;
   responsive to receiving the modification to the size of the first component in the first graphical object:
      modifying the number of impressions targeted to occur in the first advertising channel;
      modifying a size of a first component of the second graphical object automatically corresponding to the modification to the size of the first component in the first graphical object; and
      modifying the number of impressions targeted to occur in the second advertising channel.

2. The method of claim 1, wherein a size of a second component in the first graphical object represents a number of impressions that have actually occurred through specified time in the first advertising channel, and a size of a third component in the first graphical object represents a number of actions that have been taken through the specified time on impressions in the first advertising channel, and wherein a size of a first component in the second graphical object represents a number of impressions targeted to occur in the second advertising channel, a size of a second component in the second graphical object represents a number of impressions that have actually occurred through the specified time in the second advertising channel, and a size of a third component in the second graphical object represents a number of actions that have been taken through the specified time on impressions in the second advertising channel.

3. The method of claim 2, wherein selection of one of the first components in one of the graphical objects commands demographic information to be obtained about users targeted in the advertising channel related to the selected graphical object, selection of one of the second components in one of the graphical objects commands demographic information to be obtained about users to whom impressions have been displayed in the advertising channel related to the selected graphical object, and selection of one of the third components in one of the graphical objects commands demographic information to be obtained about users who have performed an action on an impression in the advertising channel related to the selected graphical object.

4. The method of claim 2, wherein the adjustment of the size of the first component in the first graphical object further commands a change to be automatically made to the size of the first component in the second graphical object and further commands a change to be automatically made to the number of impressions targeted to occur in the second advertising channel.

5. The method of claim 1, wherein each of the first advertising channel and the second advertising channel is one of:
   a web browser channel;
   an email channel;
   a text message channel;
   an Internet Protocol (IP) channel; and
   an in-home channel.

6. The method of claim 1, wherein converting the advertising content includes at least one of:
   removing graphics-based content;
   reformatting text-based content; and
   repositioning text-based content.

* * * * *